United States Patent [19]
Datta et al.

[11] Patent Number: 6,046,280
[45] Date of Patent: Apr. 4, 2000

[54] ZINC CARBOXYLIC ACID COMPLEXES IN SULFUR-VULCANIZED RUBBER COMPOSITIONS

[75] Inventors: Rabindra Nath Datta, Deventer; Arie Jacob de Hoog, Ugchelen; Johannes Hermanus Wilbrink, Bathmen, all of Netherlands

[73] Assignee: Akzo Nobel nv, Arnhem, Netherlands

[21] Appl. No.: 08/556,989

[22] PCT Filed: Jun. 3, 1994

[86] PCT No.: PCT/EP94/01810

§ 371 Date: Nov. 13, 1995

§ 102(e) Date: Nov. 13, 1995

[87] PCT Pub. No.: WO94/29379

PCT Pub. Date: Dec. 22, 1994

[30] Foreign Application Priority Data

Jun. 14, 1993 [EP] European Pat. Off. .............. 93201695

[51] Int. Cl.$^7$ .................................................. C08C 19/20
[52] U.S. Cl. .................... 525/331.8; 525/332.6; 525/370
[58] Field of Search ............... 525/331.8, 332.6, 525/370

[56] References Cited

U.S. PATENT DOCUMENTS

| | | |
|---|---|---|
| 3,687,881 | 8/1972 | Bowman . |
| 3,856,729 | 12/1974 | Shimozato . |
| 3,974,163 | 8/1976 | Yaucher et al. . |
| 5,302,315 | 4/1994 | Umland .............................. 252/182.14 |

FOREIGN PATENT DOCUMENTS

| | | | |
|---|---|---|---|
| 738500 | 7/1966 | Canada ..................................... 400/72 |
| 0 172 410 | 2/1986 | European Pat. Off. ........ C08L 21/00 |
| 0 363 562 | 4/1990 | European Pat. Off. .......... C08K 5/09 |
| 2 105 345 | 5/1993 | United Kingdom ............. C08K 5/09 |
| WO 92/07828 | 5/1992 | WIPO . |
| WO 92/07904 | 5/1992 | WIPO . |

OTHER PUBLICATIONS

The Synthesis of Bisitaconamic Acids and Isomeric Bisimide Monomers, *Journal of Polymer Science*: Polymer Chemistry Edition, vol. 20, 233–239 (1982).

The Synthesis of Biscitraconimides and Polybiscitraconimides, Anthony V. Galanti, *Journal of Polymer Science*: Polymer Chemistry Edition, vol. 19 451–457 (1981).

B. G. Crowther, High efficiency by rubber additives, paper presented at Rubbercon 1992, Jun. 15–19th 1992, Brighton, UK, organized by The Plastic & Rubber Institute, London.

B. G. Crowther, Zinc Soaps—The New Generation, paper presented at Tyretech 1990, Nov. 5–6th 1990, 65–75, Strewsubry UK, organized by European Rubber Journal and Rapra Technology Ltd.

W. Hoffmann, Rubber Technology Handbook, Chapter 4, Rubber Chemicals and Additives, pp. 217–353, Hanser Publishers, Munich 1989.

Synthesis of N–Substituted Bisitaconimide Monomers for Use as Thermosetting Polyimide Resins, S. L. Hartford, et al. *Journal of Polymer Science*: Polymer Chemistry Edition, vol. 16, 137–153 (1978).

*Primary Examiner*—Christopher Henderson
*Attorney, Agent, or Firm*—Ralph J. Mancini

[57] ABSTRACT

A rubber composition which is the vulcanization reaction product of a rubber, sulfur or a sulfur donor, particular anti-reversion coagents, and an effective amount of zinc, complexed with at least one carboxylic acid group, is disclosed. The invention also relates to a sulfur-vulcanization process which is carried out in the presence of an anti-reversion coagent and the complexed zinc and the use of an anti-reversion coagent in combination with the complexed zinc in a process for the sulfur-vulcanization of rubber. The resulting sulfur-vulcanized rubbers have significantly improved physical properties.

9 Claims, No Drawings

ZINC CARBOXYLIC ACID COMPLEXES IN SULFUR-VULCANIZED RUBBER COMPOSITIONS

This invention relates to a sulfur-vulcanized rubber composition having improved physical and mechanical properties. More particularly, it relates to a sulfur-vulcanized rubber composition which is vulcanized in the presence of an anti-reversion coagent and an effective amount of zinc, complexed with carboxylic acid. The invention also relates to a sulfur-vulcanization process which is carried out in the presence of an anti-reversion coagent and the complexed zinc and the use of an anti-reversion coagent in combination with the complexed zinc in the sulfur-vulcanization of rubber. Finally, the invention also relates to rubber products comprising rubber vulcanized with sulfur in the presence of an anti-reversion coagent and the complexed zinc.

In the tire and belt industries, among others, a better resistance to reversion is being demanded. This curing characteristic results in improved mechanical and heat resistance properties.

It has been observed that the sulfur-vulcanization of a composition comprising a rubber and an anti-reversion coagent comprising at least two groups selected from citraconimide and/or itaconimide groups results in a substantial reduction in the reversion of sulfur-vulcanized rubber compositions. This concept is generally disclosed in PCT patent applications WO 92/07904 and WO 92/07828.

However, these sulfur-vulcanized rubber products still exhibit an initial fall in torque after vulcanization is complete and subsequently a marching cure which results in a gradual increase in torque during overcure causing a "dip" in the cure curve. This leads to rubber products whose basic characteristics do not remain constant over time.

It is therefore the primary object of the present invention to improve upon the compositions disclosed by WO 92/07904 and 92/07828 by providing an effective amount of zinc, complexed with carboxylic acid, which will solve the problems associated with these compositions. It has been found that the presence of the complexed zinc during sulfur vulcanization of rubber with an anti-reversion coagent can avoid the initial fall in torque and the subsequent marching effect, shown by a substantially constant modulus after vulcanization over time, resulting in constant or even improved physical and mechanical properties.

For example, the heat resistance is improved by the use of the anti-reversion coagent in combination with the zinc complex. No detrimental effects on the properties have been observed as a result of the use of an effective amount of complexed zinc in the compositions disclosed by the above-mentioned international patent applications.

Accordingly, the present invention relates to a sulfur-vulcanized rubber composition which comprises the vulcanization reaction product of a composition containing at least:

A) 100 parts by weight of at least one natural or synthetic rubber;
B) 0.1 to 25 parts by weight of sulfur and/or a sufficient amount of a sulfur donor to provide the equivalent of 0.1 to 25 parts by weight of sulfur;
C) 0.1 to 5 parts by weight of at least one anti-reversion coagent comprising at least two groups selected from citraconimide and/or itaconimide groups; and
D) 0.25 to 1 parts by weight of zinc, complexed with at least one carboxylic acid of the formula R—COOH (I), wherein R is selected from the group of $C_{5-24}$ alkyl, $C_{5-24}$ alkenyl, $C_{5-24}$ cycloalkyl, $C_{6-24}$ aryl, $C_{7-24}$ alkylaryl, and $C_{7-24}$ arylalkyl, optionally containing oxygen and/or nitrogen, optionally substituted with one or more electron donating or withdrawing groups.

Examples of electron donating or withdrawing groups include oxygen, nitrogen, silicon, $SiO_2$, sulfoxy, boron, sulfur, phosphorus, amido, imino, azo, diazo, hydrazo, azoxy, alkoxy, hydroxy, halogen, carbonyl, carboxy, ester, ether, carboxylate, $SO_2$, $SO_3$, sulphonamido, $SiO_3$, nitro, imido, thiocarbonyl, cyano, and epoxy groups. Prefered electron donating or withdrawing groups are halogen, hydroxy, ester, and ether groups.

Examples of carboxylic acids according to formula I include $C_{8-10}$ coconut acid, stearic acid, lauric acid, oleic acid, octanoic acid, benzoic acid, chlorobenzoic acid, methylbenzoic acid, and naphthyl carboxylic acid.

Zinc is complexed by mixing zinc oxide, zinc hydroxide, or zinc carbonate with at least one carboxylic acid of the formula I. This preparation can be carried out beforehand, as explained in more detail in European patent application 0 363 562, or in situ in the rubber composition.

More preferably, R is a $C_{16-22}$ alkyl group when the complexed zinc is formed in situ and R is a mixture of $C_{7-11}$ alkyl groups and $C_{6-12}$ aryl groups when the complexed zinc is prepared prior to vulcanization.

The international patent applications WO 92/07904 and 92/07828 disclose the use of zinc oxide and stearic acid in rubber compositions in conventional amounts, as shown in the examples. Zinc oxide and stearic acid react together during vulcanization to form a zinc complex. The amount of zinc, complexed with stearic acid, present in the vulcanized rubber compositions is calculated as being not more than 0.23 parts by weight, based on 100 parts by weight of rubber. The property attributed to zinc oxide and stearic acid is activation of the sulfur vulcanization. The fact that the presence of larger amounts of zinc, complexed with at least one carboxylic acid of the present formula I, could prevent the dip and the subsequent marching of the cure curve, resulting in improved physical and mechanical properties is neither taught nor suggested by these publications.

The use of metallic zinc and/or zinc compounds is disclosed in several patent publications. For example, U.S. Pat. No. 3,687,881, GB 2 105 345, and EP 0 172 410 relate to this subject. However, none of the publications disclose or suggest the present invention.

Furthermore, one of the present zinc complexes, Struktol® Aktivator 73, is mentioned in two papers by B.G. Crowther, "High efficiency by rubber additives", paper presented at Rubbercon 1992, Jun. 15–19th, 1992, Brighton, UK, organised by The Plastic & Rubber Institute, London, and "Zinc Soaps-The New Generation", paper presented at Tyretech 1990, Nov. 5-6th, 1990, Brighton, UK, organised by European Rubber Journal and Rapra Technology Ltd. The anti-reversion properties of this complex are discussed in these two papers.

The initial fall in torque observed in the rubbers according to WO 92/07904 and 92/07828, resulting in the dip in the cure curve, might be interpreted as "reversion". However, upon testing of several anti-reversion agents it was found that most anti-reversion agents did not eliminate the dip (Comparative examples C–F). From among the anti-reversion agents tested, only zinc, complexed with at least one carboxylic acid of the formula I, resulted in preventing the dip in the cure curve.

In addition, the use of some sulfur-containing citraconimides in sulfur vulcanization is known from U.S. Pat. No. 3,974,163. These compounds inhibit premature vulcanization of diene rubbers, optionally in the presence of vulcanization accelerators. However, the compositions of the present invention and their particular advantages are neither disclosed nor suggested by this publication.

Finally, in Canadian Patent no. 738,500 the vulcanization of rubbers in the absence of sulfur, with either bis-maleimides or bis-citraconimides, is disclosed. This process had, for its purpose, to be an alternative to sulfur-vulcanization processes. However, the rubber products made by the process of this patent suffer from the usual disadvantages of peroxide-cured rubbers such as low tensile strength and significant deterioration in other important properties. This patent does not disclose the use of the bis-maleimides or bis-citraconimides in the sulfur-vulcanization of rubber.

The present invention is applicable to all natural and synthetic rubbers. Examples of such rubbers include, but are not limited to, natural rubber, styrene-butadiene rubber, butadiene rubber, isoprene rubber, acrylonitrile-butadiene rubber, chloroprene rubber, isoprene-isobutylene rubber, brominated isoprene-isobutylene rubber, chlorinated isoprene-isobutylene rubber, ethylene-propylene-diene terpolymers, as well as combinations of two or more of these rubbers and combinations of one or more of these rubbers with other rubbers and/or thermoplastics.

Examples of sulfur which may be used in the present invention include various types of sulfur such as powdered sulfur, precipitated sulfur and insoluble sulfur. Also, sulfur donors may be used in place of, or in addition to sulfur in order to provide the required level of sulfur during the vulcanization process. Examples of such sulfur donors include, but are not limited to, tetramethylthiuram disulfide, tetraethylthiuram disulfide, tetrabutylthiuram disulfide, tetrabenzylthiuram disulfide, dipentamethylene thiuram hexasulfide, dipentamethylene thiuram tetrasulfide, dithiodimorpholine, caprolactam disulfide, dialkylthiophosphoryl disulfide, and mixtures thereof.

The anti-reversion coagents used in the present invention comprise at least two groups selected from citraconimide and itaconimide. More preferably, the anti-reversion coagents are compounds represented by the general formula II:

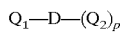

$$Q_1-D-(Q_2)_p \qquad (II);$$

wherein D, optionally containing one or more groups selected from nitrogen, oxygen, silicon, phosphorus, boron, sulphone, sulphoxy, and sulfur, is a monomeric or oligomeric divalent, trivalent or tetravalent group, p is an integer selected from 1, 2 or 3, $Q_1$ and $Q_2$ are independently selected from the formulas III and IV:

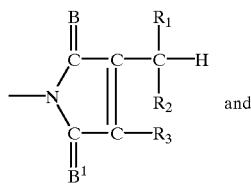

(III)

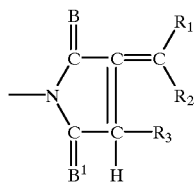

(IV)

wherein $R_1$, $R_2$ and $R_3$ are independently selected from hydrogen, $C_1$–$C_8$ alkyl groups, $C_3$–$C_{18}$ cycloalkyl groups, $C_6$–$C_{18}$ aryl groups, $C_7$–$C_{30}$ aralkyl groups and $C_7$–$C_{30}$ alkaryl groups and $R_2$ and $R_3$ may combine to form a ring when $R_1$ is hydrogen; B and $B_1$ are independently selected from oxygen and sulfur.

The imides used in the present invention are, in general, known compounds and may be prepared by the methods disclosed in, Galanti, A. V. et al., J. Pol. Sc.: Pol. Chem. Ed., Vol. 19, pp. 451–475, (1981); Galanti, A. V. et al., J. Pol. Sc.: Pol. Chem. Ed., Vol. 20, pp. 233–239 (1982); and Hartford, S. L. et al., J. Pol. Sc.: Pol. Chem. Ed., Vol. 16, pp. 137–153, 1978, the disclosures of which are hereby incorporated by reference.

The imide compounds useful in the present invention and represented by the formula II are, more preferably, the biscitraconimides wherein $Q_1$ and $Q_2$ are of the formula III, $R_1=R_2=R_3=H$, p=1 and $B=B_1=$oxygen; the bisitaconimides wherein $Q_1$ and $Q_2$ are of the formula IV, $R_1=R_2=R_3=H$, p=1 and $B=B_1=$oxygen; the mixed citraconimide and itaconimide wherein $Q_1$ is of the formula III, $Q_2$ is of the formula IV, $R_1=R_2=R_3=H$, p=1 and $B=B_1=$oxygen; and mixtures of the above-mentioned compounds.

More specifically, the group D mentioned in the formula II can be a monomeric divalent, trivalent or tetravalent linear or branched radical chosen from a $C_1$–$C_{18}$ alkyl, $C_2$–$C_{18}$ alkenyl, $C_2$–$C_{18}$ alkynyl, $C_3$–$C_{18}$ cycloalkyl, $C_3$–$C_{18}$ polycycloalkyl, $C_6$–$C_{18}$ aryl, $C_6$–$C_{30}$ polyaryl, $C_7$–$C_{30}$ aralkyl, $C_7$–$C_{30}$ alkaryl, oligomers of one or more of these radicals, and which radicals may optionally contain one or more of oxygen, nitrogen, silicon, phosphorus, sulfur, polysulfide, sulphone, sulfoxy and boron, all of which radicals may also be optionally substituted at one or more of the atoms in the radical with a substituent selected from oxygen, nitrogen, silicon, $SiO_2$, sulfoxy, boron, sulfur, phosphorus, amido, imino, azo, diazo, hydrazo, azoxy, alkoxy, hydroxy, iodine, fluorine, bromine, chlorine, carbonyl, carboxy, ester, carboxylate, $SO_2$, $SO_3$, sulphonamido, $SiO_3$, nitro, imido, thiocarbonyl, cyano, and epoxy groups.

More specific examples of some of the imide compounds useful in the present invention can be found in published international patent application publication numbers WO 92/07904 and WO 92/07828, the disclosures of which are hereby incorporated by reference.

In addition, the bis-, tris- and tetra-itaconimides of the present invention may be the same as mentioned above, except that all citraconimide groups are exchanged for itaconimide groups. The same materials as mentioned above may be mixed imides if some of the citraconimide groups are exchanged for itaconimide groups.

The amount of sulfur to be compounded with the rubber is, based on 100 parts of rubber, usually 0.1 to 25 parts by weight, and more preferably 0.2 to 8 parts by weight. The amount of sulfur donor to be compounded with the rubber is an amount sufficient to provide an equivalent amount of sulfur which is the same as if sulfur itself were used.

The amount of anti-reversion coagent to be compounded with the rubber is, based on 100 parts of rubber, 0.1 to 5 parts by weight, and more preferably 0.2 to 3 parts by weight.

The amount of zinc, complexed with at least one carboxylic acid of the formula I, to be present in the rubber is, based on 100 parts of rubber, 0.25 to 1 parts by weight. More preferably, 0.4 to 0.7 parts by weight of complexed zinc is present in the rubber composition.

These ingredients may be employed as a pre-mix, or added simultaneously or separately, and they may be added together with other rubber compounding ingredients as well.

In most circumstances it is also desirable to have a vulcanization accelerator in the rubber compound.

Conventional, known vulcanization accelerators may be employed. The preferred vulcanization accelerators include mercaptobenzothiazole, 2,2'-mercaptobenzothiazole disulfide, sulfenamide accelerators including N-cyclohexyl-2-benzothiazole sulfenamide,
N-tertiary-butyl-2-benzothiazole sulfenamide,
N,N'-dicyclohexyl-2-benzothiazole sulfenamide, and
2-(morpholinothio)benzothiazole; thiophosphoric acid derivative accelerators, thiurams, dithiocarbamates, diphenyl guanidine, diorthotolyl guanidine, dithiocarbamylsulfenamides, xanthates, triazine accelerators and mixtures thereof. It is generally known that zinc present in a rubber composition will also complex with some accelerator compounds. However, in the present application the mentioning of complexed zinc relates only to zinc complexed with carboxylic acid.

When the vulcanization accelerator is employed, quantities of from 0.1 to 8 parts by weight, based on 100 parts by weight of rubber composition, are used. More preferably, the vulcanization accelerator comprises 0.3 to 4 parts by weight, based on 100 parts by weight of rubber.

Other conventional rubber additives may also be employed in their usual amounts. For example, reinforcing agents such as carbon black, silica, clay, whiting and other mineral fillers, as well as mixtures of fillers, may be included in the rubber composition. Other additives such as process oils, tackifiers, waxes, antioxidants, antiozonants, pigments, resins, plasticizers, process aids, factice, and compounding agents may be included in conventional, known amounts. For a more complete listing of rubber additives which may be used in combination with the present invention see, W. Hofmann, "Rubber Technology Handbook, Chapter 4, Rubber Chemicals and Additives, pp. 217–353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexyl-thiophthalimide, salicylic acid, benzoic acid, maleic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional, known quantities.

The present invention also relates to a vulcanization process which comprises the step of vulcanizing at least one natural or synthetic rubber in the presence of 0.1 to 25 parts by weight of sulfur or a sulfur donor per 100 parts by weight of rubber, characterized in that said process is carried out in the presence of an effective amount of an anti-reversion coagent and an effective amount of zinc, complexed with carboxylic acid.

The process is carried out at a temperature of 110–220° C. over a period of up to 24 hours. More preferably, the process is carried out at a temperature of 120–190° C. over a period of up to 8 hours in the presence of 0.1 to 5 parts by weight of anti-reversion coagent and 0.25 to 1 parts by weight of zinc, complexed with at least one carboxylic acid of the formula I. Even more preferable is the use of 0.2–3 parts by weight of anti-reversion coagent with 0.4 to 0.7 parts by weight of complexed zinc. All of the additives mentioned above with respect to the rubber composition may also be present during the vulcanization process of the invention.

In a more preferred embodiment of the vulcanization process, the vulcanization is carried out at a temperature of 120–190° C. over a period of up to 8 hours and in the presence of 0.1 to 8 parts by weight, based on 100 parts by weight of rubber, of at least one vulcanization accelerator.

In another preferred embodiment of the vulcanization process, the anti-reversion coagent is selected from a compound of the formula II.

The present invention also comprises the use of an anti-reversion coagent in combination with an effective amount of complexed zinc in a process for the sulfur-vulcanization of rubber.

Finally, the present invention also includes articles of manufacture, such as tires, belts or inner tubes which comprise sulfur-vulcanized rubber which is vulcanized in the presence of the anti-reversion coagents and an effective amount of complexed zinc of the present invention. More particularly, the compositions of the present invention can be used in tire treads for truck tires and off-the-road tires, in particular, for sidewalls, for tire carcasses and for steelcord skim stocks. In belts, the rubber compositions of the present invention are particularly useful for conveyor belts and V-belts which are subjected to high loading and abrasion in service.

The invention is further illustrated by the following examples which are not to be construed as limiting the invention in any way. The scope of the invention is to be determined from the claims appended hereto.

EXPERIMENTAL METHODS USED IN THE EXAMPLES

Compounding, Vulcanization and Characterization of Compounds

In the following examples, rubber compounding, vulcanization and testing was carried out according to standard methods except as otherwise stated:

Base compounds were mixed in a Werner & Pfleiderer mixer (volume 5.0 liter; 70% load factor; preheating at 50° C.; rotor speed 30 rpm; mixing time 6 min).

Vulcanization ingredients and coagents were addded to the compounds on a Schwabenthan Polymix 150L two-roll mill (friction 1:1.22, temperature 40°–50° C., mixing time 10 min).

Cure characteristics were determined using a Monsanto rheometer MDR 2000E (range 3 Nm/arc 0.5°, ISO 6502-91): delta torque or extent of crosslinking ($R_\infty$) is the maximum torque (MH, also denoted as initial torque maximum, $T_i$) minus the minimum torque (ML). Scorch safety ($t_s2$) is the time to 2% of delta torque above minimum torque (ML), optimum cure time ($t_{90}$) is the time to 90% of delta torque above minimum.

Sheets and test specimens were vulcanized by compression molding in a Fontyne TP-400 press.

Tensile measurements were carried out using a Zwick 1445 tensile tester (ISO-37/2 dumbbells, except for tear resistance: ISO 34 Crescent with 1 mm cut).

Abrasion was determined using a Zwick abrasion tester as volume loss per 40 m path travelled (ISO 4649).

Heat build-up and permanent set after dynamic loading were determined using a Goodrich Flexometer (load 1 MPa, stroke 0.445 cm, frequency 30 Hz, start temperature 100° C., running time 30 min; ISO 4666/3—1982).

Examples 1–3 and Comparative Examples A-B

Natural rubber was vulcanized using formulations listed in Table 1. The "amount zinc" mentioned in the Table is the amount of zinc, complexed with carboxylic acid.

TABLE 1

| Example No. | A | B | 1 | 2 | 3 |
|---|---|---|---|---|---|
| NR SMR CV | 100 | 100 | 100 | 100 | 100 |
| C. Black (N-330) | 50 | 50 | 50 | 50 | 50 |
| Ar. Oil | 3 | 3 | 3 | 3 | 3 |
| CBS | 1.5 | 1.5 | 1.5 | 1.5 | 1.5 |
| Sulfur | 1.5 | 1.5 | 1.5 | 1.5 | 1.5 |
| BCI-MX | — | 1.0 | 0.5 | 0.5 | 0.5 |
| Zinc Oxide RS | 5 | 5 | 5 | 5 | 5 |
| Stearic Acid | 2 | 2 | 2 | 2 | 2 |
| amount zinc | 0.23 | 0.23 | 0.23 | 0.23 | 0.23 |
| Zinc Oxide RS | — | — | — | — | 2 |
| Stearic Acid | — | — | — | 2 | 4 |
| Struktol 1® Akt.73 | — | — | 2 | — | |
| amount zinc | — | — | 0.36 | 0.23 | 0.46 |
| total amount zinc | 0.23 | 0.23 | 0.59 | 0.46 | 0.69 |

Ar. Oil: aromatic oil Ingralen 150® CBS: Perkacit® CBS grs: n-cyclohexyl-2-benzothiazole sulfenamide BCI-MX: N,N'-m-xylylene-bis-citraconimide

TABLE 2

Table 2 lists the cure characteristics of the compositions A-B and 1–3 obtained at 150° C. and 170° C. Values in parentheses designate the values obtained for the vulcanizates cured at 170° C.

| Example No. | A | B | 1 | 2 | 3 |
|---|---|---|---|---|---|
| Extent of crosslinking, R∞ (Nm) | 1.8 (1.6) | 1.8 (1.6) | 1.8 (1.6) | 1.8 (1.5) | 1.7 (1.5) |
| Scorch safety, $t_s2$ (min) | 5.2 (1.5) | 5.3 (1.5) | 5.5 (1.6) | 5.5 (1.6) | 5.4 (1.6) |
| Optimum cure time, $t_{90}$ (min) | 8.7 (2.4) | 9.1 (2.5) | 12.4 (3.1) | 10.3 (2.9) | 13.0 (3.1) |

The vulcanized rubbers were then tested for physical and mechanical properties.

TABLE 3

Table 3 lists the properties of the vulcanizates cured at 150° C. for $t_{90}$ and for 60 minutes. Values in parentheses are the values obtained for the vulcanizates cured at 150° C. for 60 min.

| Test | A | B | 1 | 2 | 3 |
|---|---|---|---|---|---|
| Modulus 50% (MPa) | 1.7 (1.5) | 1.7 (1.7) | 1.7 (1.7) | 1.7 (1.7) | 1.7 (1.8) |
| Modulus 100% (MPa) | 3.2 (2.9) | 3.3 (3.2) | 3.3 (3.5) | 3.3 (3.3) | 3.3 (3.4) |
| Modulus 300% (MPa) | 16.5 (14.8) | 17.1 (16.9) | 17.1 (17.2) | 16.5 (16.5) | 16.5 (16.3) |
| Tensile str. (MPa) | 29.0 (27.1) | 30.2 (27.2) | 31.2 (29.0) | 28.9 (27.8) | 29.0 (27.3) |
| Tear str. (kN/m) | 139 (97) | 131 (93) | 148 (86) | 149 (81) | 115 (91) |
| Elongation (%) | 485 (490) | 515 (425) | 475 (410) | 505 (440) | 485 (420) |
| Abrasion (mm³) | 134 (130) | 124 (115) | 118 (117) | 117 (107) | 120 (109) |
| Heat build up, 100° C. (ΔT, °C.) | 20 (24) | 19 (19) | 18 (18) | 18 (17) | 18 (17) |
| Permanent set (%) | 9 (6) | 8 (4) | 8 (4) | 8 (3) | 8 (4) |

TABLE 4

Table 4 lists the properties of the vulcanizates cured at 170° C. for $t_{90}$ and for 60 minutes. Values in parentheses are the values obtained for the vulcanizates cured at 170° C. for 60 min.

| Test | A | B | 1 | 2 | 3 |
|---|---|---|---|---|---|
| Modulus 50% (MPa) | 1.4 (1.2) | 1.5 (1.7) | 1.4 (1.5) | 1.5 (1.5) | 1.5 (1.5) |
| Modulus 100% (MPa) | 2.8 (2.2) | 3.0 (3.2) | 2.8 (2.8) | 3.0 (2.9) | 2.7 (2.8) |
| Modulus 300% (MPa) | 14.9 (11.4) | 15.5 (16.2) | 15.8 (15.7) | 15.2 (14.9) | 15.3 (14.7) |
| Tensile str. (MPa) | 29.1 (21.4) | 30.1 (25.7) | 30.7 (28.5) | 29.1 (26.0) | 28.7 (25.6) |
| Tear str. (kN/m) | 135 (29) | 140 (58) | 140 (61) | 138 (52) | 125 (59) |
| Elongation (%) | 485 (480) | 535 (410) | 505 (410) | 525 (440) | 525 (435) |
| Abrasion (mm³) | 109 (207) | 108 (123) | 103 (120) | 110 (133) | 107 (126) |
| Heat build up, 100° C. (ΔT, °C.) | 17 (35) | 17 (22) | 17 (22) | 17 (22) | 16 (22) |
| Permanent set (%) | 6 (8) | 5 (3) | 4 (4) | 4 (4) | 5 (4) |

From the results in Tables 3-4 it is clear that compositions according to the invention show no marching effect and have constant or even improved basic properties in the ultimate vulcanizates. More particularly composition A shows a decrease in modulus during overcure signifying reversion. Composition B has a marching modulus, i.e. an increase in modulus during overcure. However, compositions 1–3 show a retention of the modulus during overcure and improvement of the ultimate vulcanizates, as is seen for example in the reduction of the heat build up and permanent set, resulting in an improved heat resistance.

Example 4 and Comparative Examples C–F

Natural rubber was vulcanized in the presence of several commercially available anti-reversion agents and the zinc complex of the present invention. The formulations are listed in Table 5. The "amount zinc" mentioned in the Table is the amount of zinc, complexed with carboxylic acid.

TABLE 5

| Example No. | C | D | E | F | 4 |
|---|---|---|---|---|---|
| NR SMR CV | 100 | 100 | 100 | 100 | 100 |
| C. Black (N-330) | 50 | 50 | 50 | 50 | 50 |
| Ar. Oil | 3 | 3 | 3 | 3 | 3 |
| CBS | 0.6 | 0.6 | 0.6 | 0.6 | 0.6 |
| Sulfur | 2.3 | 2.3 | 2.3 | 2.3 | 2.3 |
| BCI-MX | — | 1.0 | 1.0 | 1.0 | 1.0 |
| Zinc Oxide RS | 5 | 5 | 5 | 5 | 5 |
| Stearic Acid | 2 | 2 | 2 | 2 | 2 |
| amount zinc | 0.23 | 0.23 | 0.23 | 0.23 | 0.23 |
| HTS | — | — | 1.0 | — | — |
| Si-69 | — | — | — | 2.0 | — |
| Struktol 1® Akt.73 | — | — | — | — | 2.0 |
| amount zinc | — | — | — | — | 0.36 |
| total amount zinc | 0.23 | 0.23 | 0.23 | 0.23 | 0.59 |

Ar. Oil: aromatic oil Ingralen 150® CBS: Perkacit® CBS grs: n-cyclohexyl-2-benzothiazole sulfenamide BCI-MX: N,N'-m-xylylene-bis-citraconimide HTS: Duralink® HTS: Hexamethylene 1,6-bisthiosulphate disodiumdihydrate Si-69: Bis(3-triethoxysilylpropyl) tetrasulphide

TABLE 6

Table 6 lists the torque values of the compositions D-E and 3–6 measured at tmax, 10, 20, and 30 minutes cured at 170° C.

| Example No. | C | D | E | F | 4 |
|---|---|---|---|---|---|
| torque max. | 1.85 | 1.90 | 1.84 | 1.95 | 1.84 |
| 10 minutes | 1.70 | 1.75 | 1.70 | 1.75 | 1.80 |
| 20 minutes | 1.60 | 1.70 | 1.70 | 1.70 | 1.80 |
| 30 minutes | 1.55 | 1.80 | 1.80 | 1.80 | 1.80 |

The results in Table 6 show that composition C suffers from an initial fall in torque and further reversion. Compositions D–F show the beginning of a marching cure. However, the compositions of the present invention show a clear retention of the torque, thus no initial fall in torque, i.e. essentially no dip, and essentially no marching.

What is claimed is:

1. A sulfur-vulcanizable rubber composition which comprises:

(A) 100 parts by weight of at least one natural or synthetic rubber;

(B) 0.1 to 25 parts by weight of sulfur and/or a sufficient amount of a sulfur donor to provide the equivalent of 0.1 to 25 parts be weight of sulfur;

(C) 0.1 to 5 parts by weight of at least one anti-reversion coagent comprising at least two groups selected from citraconimide and/or itaconimide groups; and (D) 0.1 to 1 part, by weight of zinc, complexed with at least one carboxylic acid of the formula R—COOH (I), wherein R is selected from the group $C_{5-24}$ alkyl, $C_{5-24}$ alkenyl, and $C_{5-24}$ cycloalkyl, $C_{6-24}$ aryl, $C_{7-24}$ alkylaryl, and $C_{7-24}$ arylalkyl.

2. The composition of claim 1 wherein the carboxylic acid is substituted with one or more electron donating or withdrawing groups selected from oxygen, nitrogen, silicon, $SiO_2$, sulfoxy, boron, sulfur, phosphorus, amido, imino, azo, diazo, hydrazo, azoxy, alkoxy, hydroxy, halogen, carbonyl, carboxy, ester, ether, carboxylate, $SO_2$, $SO_3$, sulphonamido, $SiO_3$, nitro, imido, thicarbonyl, cyano, and epoxy groups.

3. The composition of claim 2 wherein the electron donating or withdrawing group is selected from halogen, hydroxy, ester, and ether groups.

4. The composition of claim 1 wherein R is a $C_{16-22}$ alkyl group and the complexed zinc is formed is situ.

5. The composition of claim 1 wherein R is a mixture of $C_{7-11}$ alkyl groups and $C_{6-12}$ aryl groups and the complexed zinc is added to the vulcanizable composition.

6. A process for vulcanizing a vulcanizable composition at a temperature of from 100 to 220° C. for up to 24 hours, wherein said vulcanizable composition comprises 100 parts by weight of at least one natural or synthetic rubber in the presence of 0.1 to 25 parts by weight of sulfur and/or a sufficient amount of sulfur donor to provide the equivalent of 0.1 to 25 parts by weight of sulfur, wherein said process is carried out in the presence of 0.1 to 5 parts by weight of at least one anti-reversion coagent comprising at least two groups selected from citraconimide and/or itaconimide groups, and in the presence of 0.25 to 1 part by weight of zinc, complexed with at least one carboxylic acid of the formula R—COOH (I), wherein R is selected from the group of $C_{5-24}$ alkyl, $C_{5-24}$ alkenyl, and $C_{5-24}$ cycloalkyl, $C_{6-24}$ arly, $C_{7-24}$ alkylaryl, and $C_{7-24}$ arylalkyl.

7. The process of claim 6 wherein the complexed zinc is formed in situ.

8. The process of claim 6 wherein the complexed zinc is added to the vulcanizable composition.

9. An article of manufacture comprising a rubber vulcanized by the process of claim 6.

* * * * *